(12) United States Patent
MacInnis et al.

(10) Patent No.: US 9,307,258 B2
(45) Date of Patent: Apr. 5, 2016

(54) PARALLEL TRANSCODING

(71) Applicant: Broadcom Corporation, Irvine, CA (US)

(72) Inventors: Alexander MacInnis, Los Altos, CA (US); Hongtao Zhu, San Jose, CA (US); Jason Herrick, Pleasanton, CA (US); Brian Schoner, Fremont, CA (US); Junlin Li, San Jose, CA (US)

(73) Assignee: BROADCOM CORPORATION, Irvine, CA (US)

(*) Notice: Subject to any disclaimer, the term of this patent is extended or adjusted under 35 U.S.C. 154(b) by 704 days.

(21) Appl. No.: 13/663,651

(22) Filed: Oct. 30, 2012

(65) Prior Publication Data
US 2014/0119457 A1 May 1, 2014

(51) Int. Cl.
| | | |
|---|---|---|
| H04N 7/12 | (2006.01) |
| H04N 7/26 | (2006.01) |
| H04N 19/40 | (2014.01) |
| H04N 7/50 | (2006.01) |
| H04N 19/124 | (2014.01) |
| H04N 19/177 | (2014.01) |
| H04N 19/179 | (2014.01) |
| H04N 19/85 | (2014.01) |

(52) U.S. Cl.
CPC .............. *H04N 19/40* (2014.11); *H04N 19/124* (2014.11); *H04N 19/177* (2014.11); *H04N 19/179* (2014.11); *H04N 19/85* (2014.11)

(58) Field of Classification Search
CPC . H04N 7/50; H04N 7/26941; H04N 21/2365; H04N 21/4347; H04N 7/26244
See application file for complete search history.

(56) References Cited

U.S. PATENT DOCUMENTS

| | | | | |
|---|---|---|---|---|
| 5,805,220 A * | 9/1998 | Keesman | ........... | H04N 21/2365 348/382 |
| 6,493,386 B1 * | 12/2002 | Vetro | ..................... | H04N 21/84 375/240.1 |
| 2004/0255328 A1 * | 12/2004 | Baldwin | ................ | H04N 21/21 725/90 |
| 2005/0097169 A1 * | 5/2005 | Mukherjee | ............... | G09B 5/06 709/204 |
| 2006/0288117 A1 * | 12/2006 | Raveendran et al. | ......... | 709/236 |
| 2007/0030903 A1 * | 2/2007 | Cote | .................... | H04N 19/176 375/240.16 |
| 2007/0030904 A1 * | 2/2007 | Winger | ............ | H04N 19/00472 375/240.16 |
| 2007/0030905 A1 * | 2/2007 | Cote | .................. | H04N 7/26861 375/240.16 |
| 2007/0091928 A1 * | 4/2007 | Wee et al. | ...................... | 370/474 |
| 2008/0152015 A1 * | 6/2008 | Benzreba | ............. | H04N 19/176 375/240.24 |
| 2009/0257508 A1 * | 10/2009 | Aggarwal | ............... | H04N 5/783 375/240.25 |
| 2011/0216785 A1 * | 9/2011 | Begen | ....................... | H04J 3/18 370/477 |
| 2011/0217025 A1 * | 9/2011 | Begen | .................... | H04N 5/931 386/338 |
| 2012/0230404 A1 * | 9/2012 | Cote | .................. | H04N 7/26861 375/240.12 |

* cited by examiner

*Primary Examiner* — Sath V Perungavoor
*Assistant Examiner* — Howard D Brown, Jr.
(74) *Attorney, Agent, or Firm* — Foley & Lardner LLP

(57) ABSTRACT

Disclosed are various embodiments directed to transcoding a media file in parallel. A media file may be accessed, the media file comprising a bit stream expressing a series of pictures. A first random access point in the bit stream and a second random access point in the bit stream are identified. An input segment of the bit stream is generated, the input segment comprising a starting point, the starting point being the first random access point. One of a plurality of transcoders is selected to transcode the input segment for generating a corresponding output segment, each transcoder being configured to operate concurrently in parallel. The output segment is stored in a memory.

24 Claims, 8 Drawing Sheets

US 9,307,258 B2

PARALLEL TRANSCODING

BACKGROUND

Media items such as movies, television shows, music, etc. may be digitally stored as media files in various file formats. Media devices that playback these media files may be limited to a set of file formats that are supported by the media device. For example, a media device may not support particular formats such as, for example, high definition, high frame rates, various compression formats, etc. To successfully play back media files in such devices, the media files may need to be transcoded. Media devices may have limited storage capacity, and it may be desirable to transcode media files into a format with a smaller file size. By performing transcoding on a media file, the media file may be converted from an unsupported file format to a supported file format, and the media file may be converted from a larger file size to a smaller file size.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to transcoding a media file to generate a transcoded media file. A media item such as, for example, a television show, a movie, a song, an audio book, etc., may be stored as a digital file in a variety of formats or a combination of formats. For example, a media file may be encoded in accordance with a particular standard, file format, frame rate, media quality, or any other format for storing a digital media file. Media files stored in an original format may not be suitable for presentation in particular media devices, or they may be too large to store in particular media devices, or for any reason it may be desirable to reduce the size of the media files. Thus, a format conversion is required to modify the media file in order to render it presentable in a target media device or reduce the size of the media file to render it suitable for storage in or transmission to a target media device. Full transcoding may be used to convert a file from one format to another format. Full transcoding involves completely decoding the media file to a raw file in a raw format, processing the raw file by performing any number of specified operations, and encoding the raw file to a target format. Alternatively, transcoding without completely decoding the media file may be used.

Various embodiments of the present disclosure are directed to employing a set of transcoding devices in parallel to transcode a media file. The media file may be divided into a plurality of segments. Segments may be determined based at least upon the symbols/signals that are present in the media file. Each segment may be allocated to an available transcoding device to generate a corresponding output segment. Output segments may be sequenced and stitched together to form a transcoded media file. Furthermore, various embodiments of the present disclosure address managing encoder settings for each parallel transcoder to facilitate generating an output file that is uniform in terms of quality.

Figure 1:
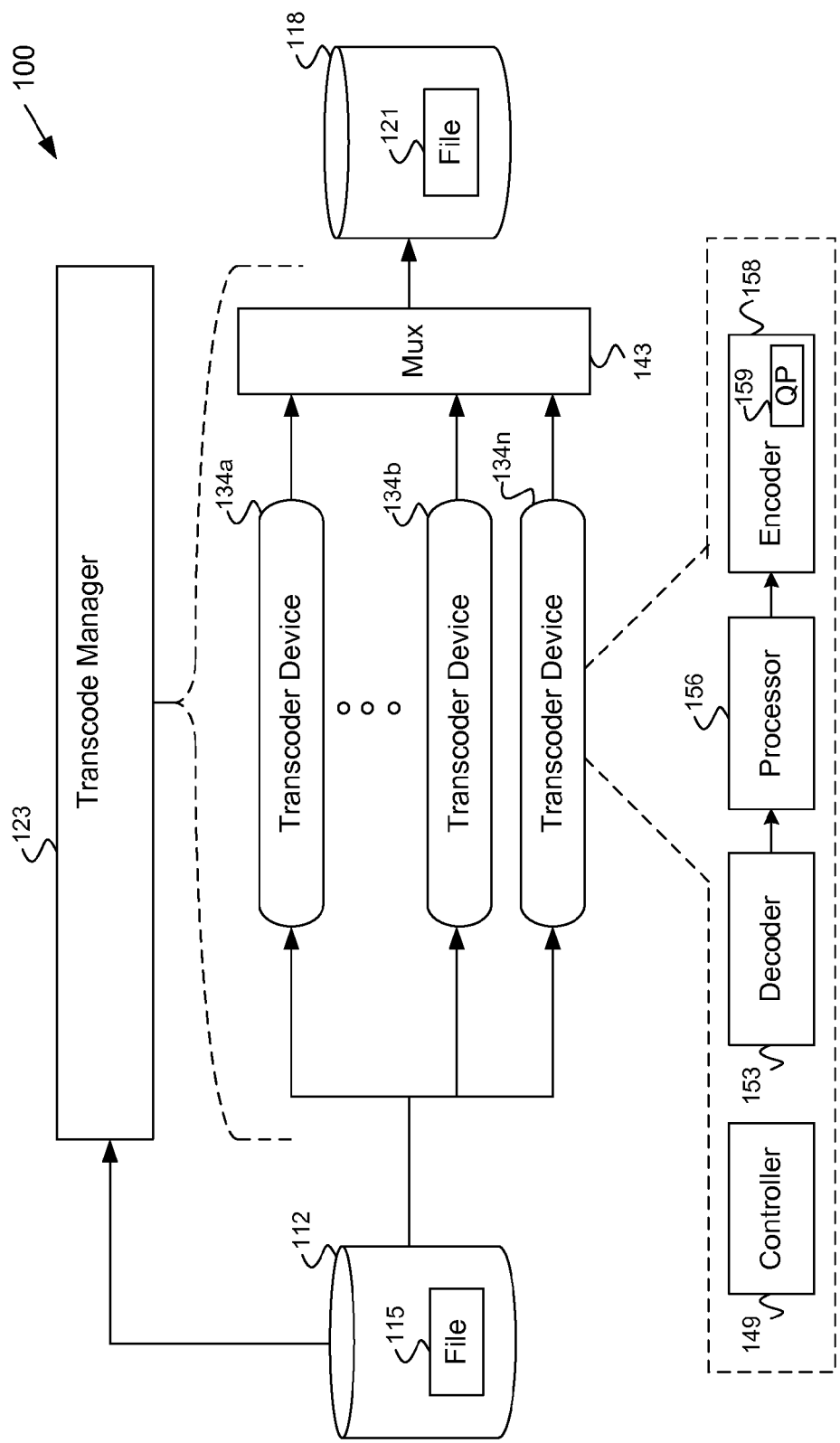
FIG. 1 is a drawing of an example of a transcoding system, in accordance with various embodiments of the present disclosure.

Moving onto FIG. 1, shown is a drawing of an example of a transcoding system 100, in accordance with various embodiments of the present disclosure. A transcoding system 100 may be implemented as at least a portion of a set top box (STB) or computing device configured to handle media files. The transcoding system 100 comprises a source memory storage 112, a destination memory storage 118, a transcode manager 123, a plurality of transcoder devices 134*a-n*, and a multiplexor (mux) 143.

Non-limiting examples of the source memory storage 112 are magnetic tapes, magnetic floppy diskettes, magnetic hard drives, memory cards, solid-state drives, USB flash drives, optical discs, or random access memory (RAM) including, for example, static random access memory (SRAM) and dynamic random access memory (DRAM), or magnetic random access memory (MRAM). In addition, the source memory storage 112 may be a read-only memory (ROM), a programmable read-only memory (PROM), an erasable programmable read-only memory (EPROM), an electrically erasable programmable read-only memory (EEPROM), or other type of memory device.

The source memory storage 112 is configured to store an input media file 115. The input media file 115 may represent an audio and/or video program such as, for example, a television show, a movie, a song, an audio book, etc. The source memory storage 112 may be implemented as a portion of an STB for storing broadcasted media. To this end, the input media file 115 may be a program transmitted to an STB over a network.

The destination memory storage 118 may comprise, for example, magnetic tapes, magnetic floppy diskettes, magnetic hard drives, memory cards, solid-state drives, USB flash drives, optical discs, or random access memory (RAM) including, for example, static random access memory (SRAM) and dynamic random access memory (DRAM), or magnetic random access memory (MRAM). In addition, the destination memory storage 118 may be a read-only memory (ROM), a programmable read-only memory (PROM), an erasable programmable read-only memory (EPROM), an electrically erasable programmable read-only memory (EEPROM), or other type of memory device.

The destination memory storage 118 is configured to store an output media file 121. The output media file 121 is a transcoded version of the input media file 115. To this end, the output media file 121 expresses the same substantive content as the input media file 115. The output media file 121 may express a subset of the content of the input media file 115. However, the output media file 121 is encoded in a format that differs from the format of the input media file 115. A different format of the output media file 121 may conform to the same standard as the input media file 115 while having a different bit rate or file size. The destination memory storage 118 may be implemented in a media device that is separate from a media device that comprises the source memory storage 112. For example, the source memory storage 112 may be implemented as a portion of an STB and the destination memory storage 118 may be a remote media device such as a computing device configured to present the output media file 121 to a user. A media device may be, for example, a laptop computer, desktop computer, notepad, notebook, ultrabook, tablet, cellular telephone, personal digital assistant (PDA), STB, digital camera, portable media player, or any other computing device configured to playback a media file. Alternatively, the destination memory storage 118 may be implemented in a media device that is the same as a media device that comprises the source memory storage 112.

The transcode manager 123 is configured to manage the transcoding of the input media file 115. In various embodiments, the transcode manager 123 is implemented as at least a portion of a microprocessor. The transcode manager 123 may include one or more circuits, one or more microprocessors, or any combination thereof. In yet other embodiments, the transcode manager 123 may include one or more software modules executable within one or more processing circuits. The transcode manager 123 may further include computer-readable medium. The computer-readable medium may store instructions and/or code to cause the transcode manager 123 to manage transcoding operations in the transcoding system 100.

The transcode manager 123 may retrieve the input media file 115 and prepare the input media file 115 for transcoding. For example, the transcode manager 123 handles the input media file 115 as a digital bit stream and allocates segments of the bit stream to various transcoder devices 134a-n. For example, the transcode manager 123 may send a segment to a transcoder device 134a-n as a stream without specifying a segment length or ending point in the stream. When the transcoder device 134a-n is nearing completion of the transcoding process or has completed the transcoding process, the transcoder device 134a-n may indicate to the transcode manager 123 to stop feeding the input segment stream. Alternatively, the transcode manager 123 may allocate an input segment as a stream while specifying a default or nominal length/ending point. The transcode manager 123 is also configured to monitor each transcoder device 134a-n by managing one or more transcoder parameters.

The transcode manager 123 may be configured to initiate one or more transcoder processes for transcoding the input media file 115. Each transcoder process may be executed concurrently to processes portions of the input media file 115 in parallel. The transcode manager 123 may be configured to initiate one or more transcode processes by utilizing one or more transcoder devices 134a-n. Furthermore, the transcode manager 123 may operate a mux 143 for sequencing the outputs of the transcoder devices 134a-n for generating an output media file 121.

The mux 143 is configured to handle the outputs of each transcoder device 134a-n. The mux 143 may also assemble each of the outputs to generate the output media file. The output media file 121 may then be written to the destination memory storage 118. In various embodiments, the mux 143 is communicatively coupled to a memory buffer to store the transcoder device outputs in a queue.

The transcoding system 100 comprises a plurality of transcoder devices 134a-n. Each transcoder device 134a-n is configured to process portions of the input media file 115 to effectuate parallel transcoding. A transcoder device 134a-n performs one or more transcoder processes. In this respect, a transcoder device 134a-n may be configured to perform multiple transcoder processes in parallel to transcode various inputs concurrently. Each transcoder device 134a-n may be a video transcoder or an audio transcoder. In various embodiments, each transcoder device 134a-n is implemented as at least a portion of a microprocessor. Each transcoder device 134a-n may include one or more circuits, one or more microprocessors, or any combination thereof. To this end, the various transcoder devices 134a-n may be implemented by one circuit and/or microprocessor or may be implemented by multiple circuits and/or microprocessors such that the functionality of the transcoder devices 134a-n is distributed across one or more circuits and/or one or more microprocessors. In yet other embodiments, each transcoder device 134a-n may include one or more software modules executable within one or more processing circuits. Each transcoder device 134a-n may further include computer-readable medium. The computer-readable medium may store instructions and/or code to cause the transcoder device 134a-n to transcode portions of the input media file 115.

Each transcoder device 134a-n is configured to receive a segment of the input media file 115 and generate a corresponding output segment. Accordingly, the output segment is a transcoded version of the input segment. Each transcoder device 134a-n comprises a respective controller 149, a respective decoder 153, a respective processor 156, and a respective encoder 158.

The controller 149 for each transcoder device 134a-n provides an interface between the transcoder device 134a-n and the transcode manager 123. For example, the controller 149 may allow for a transcoder device 134a-n to be enabled or disabled. The controller 149 may indicate a transcoding progress of the transcoding device 134a-n to the transcode manager 123. The controller 149 may also maintain a workload queue of a transcoder device 134a-n that indicates an amount of work scheduled to be performed by a transcoder device 134a-n. Transcoding progress, for example, may indicate whether a transcoder is busy or not.

The decoder 153 of each transcoder device 134a-n is configured to decode and/or decompress received inputs into a raw format. For example, the decoder 153 portion of a video transcoder 134a-n may convert input media file segments into raw pixel data.

The processor 156 of each transcoder device 134a-n is configured to process the raw outputs of the decoder 153. For video transcoder devices 134a-n, the processor 156 is a pixel processor that may perform pixel processing functions. Non-limiting examples of pixel processing are picture size adjustment, interlacing/de-interlacing, color space conversion, noise reduction, and image enhancement. Pixel processing may comprise changing a format. For example, a format change may be high definition (HD) conversion, standard definition (SD) conversion, 2-channel conversion, de-interlacing, etc. After the processor 156 receives a decoded input media file segment and processes the input media file segment, the processor 156 sends the processed input media file segment to the encoder 158.

The encoder 158 for each transcoder device 134a-n is configured to encode processed input media file segments by encoding the processed input media file segments to a target format. For video transcoders 134a-n, the encoder 158 encodes each processed input media file segment according to a quantization parameter (QP) 159. Depending on the complexity of the input segment, the encoder 158 may adjust the QP 159 to achieve an optimal output. Although the encoder of each transcoder device 134a-n may dynamically adjust the QP 159, the transcode manager 123 may also control the QP 159 for each encoder 158. For example the transcode manager 123 may initialize each QP 159 to an initial value for controlling the uniformity of each QP 159 of each encoder 158. In various embodiments, the transcode manager 123 may force the QP 159 value of each encoder 158 to converge at a predetermined QP range.

Figure 2:
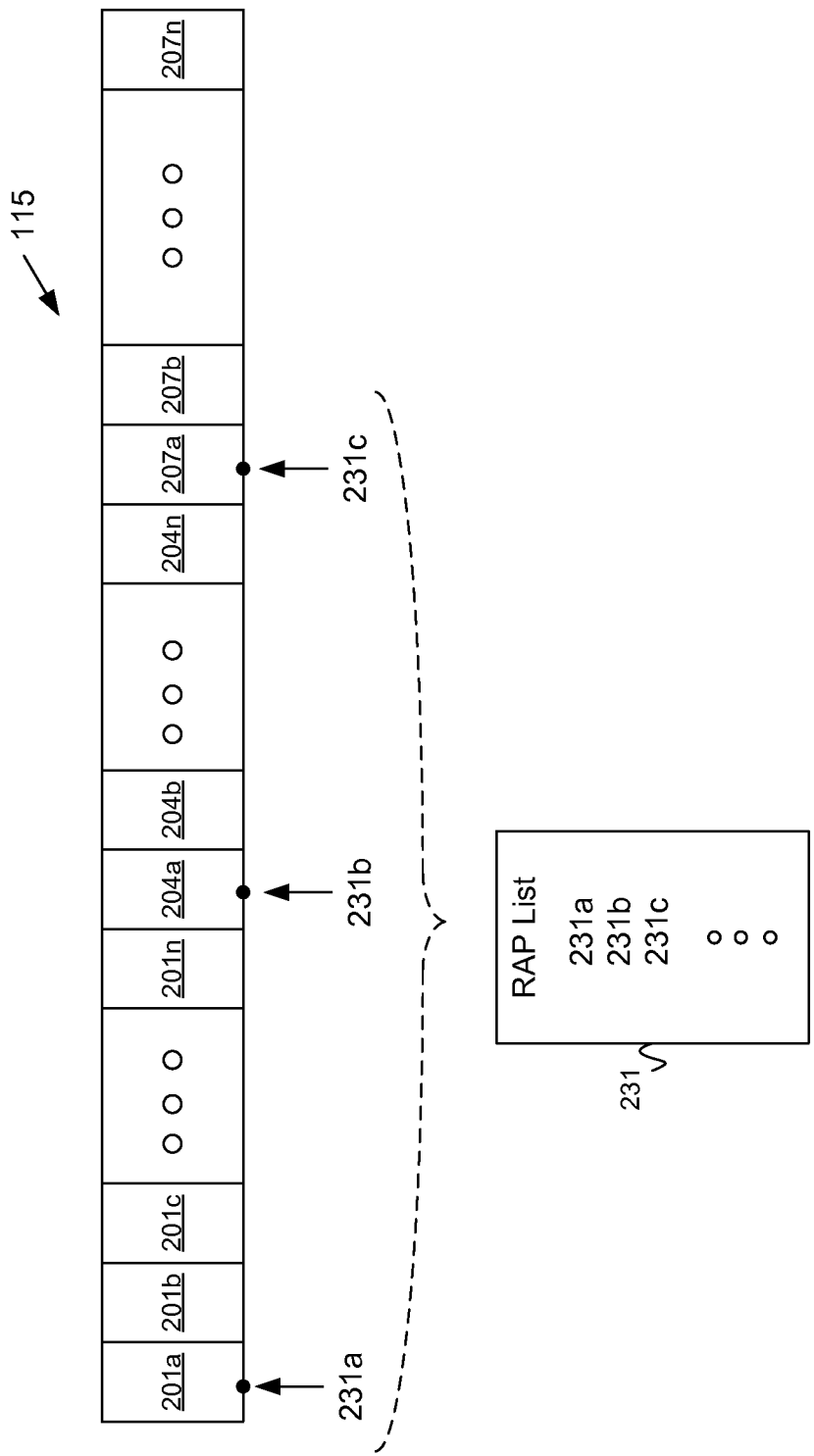
FIG. 2 is a diagram of an example of an input media file within the transcoding system of FIG. 1, in accordance with various embodiments.

Next, in FIG. 2 shown is a diagram of an example of an input media file 115 within the transcoding system 100 of FIG. 1, in accordance with various embodiments. FIG. 2 depicts an input media file 115 expressed in terms of a series of pictures that may ultimately be ordered according to an order of presentation. The order of the pictures in the bit stream may differ from the order that the pictures are meant to be presented, which may be the case for particular video compression standards. The input media file 115 may also be expressed in terms of a bit stream. In this respect, a series of bits make up an individual picture.

The input media file 115 comprises a plurality of pictures 201a-n, 204a-n, 207a-n. The input media file 115 also comprises random access points (RAPs) 231a-231c. Each RAP 231a-c is a picture with characteristics that enable decoding starting from the RAP 231a-c. A RAP list 231 identifies RAPs that exist in the input bit stream of the input media file 115.

In various embodiments, the RAP list 231 may be obtained from a process that indicates the locations of RAPs 231a-c in a stream as the stream is being received and stored in an input media file 115. In alternative embodiments, the RAP list 231 may be obtained by the transcoding system 100 (FIG. 1) that processes the input media file 115. For example, the transcode manager 123 (FIG. 1) may be configured to parse the bit stream of the input media file 115 and identify a set of RAPs 231a-c. Regardless of how the RAP list 231 is ascertained, the transcode manager 123 may use the RAP list 231 to divide the input media file 115 into segments to facilitate parallel transcoding.

In various embodiments, a RAP 231a-c is an I-picture (intra-coded picture). An I-picture is a fully specified picture that does not require other pictures for decoding. That is to say, I-pictures are independent pictures. Referring to FIG. 2, a first set of pictures 201a-n begins with a first RAP 231a, a second set of pictures 204a-n begins with a second RAP 231b, and a third set of pictures 207a-n begins with a third RAP 231c. A RAP may be any picture that has characteristics that enables a decoding starting from that picture.

In various embodiments, each set of pictures 201a-n, 204a-n, 207a-n may comprise a respective last picture 201n, 204n, 207n, where the respective last picture is a P-picture (predicted picture) or a B-picture (Bi-predicted picture). P-pictures and B-pictures are partially specified pictures that require other pictures for decoding.

Figure 3:
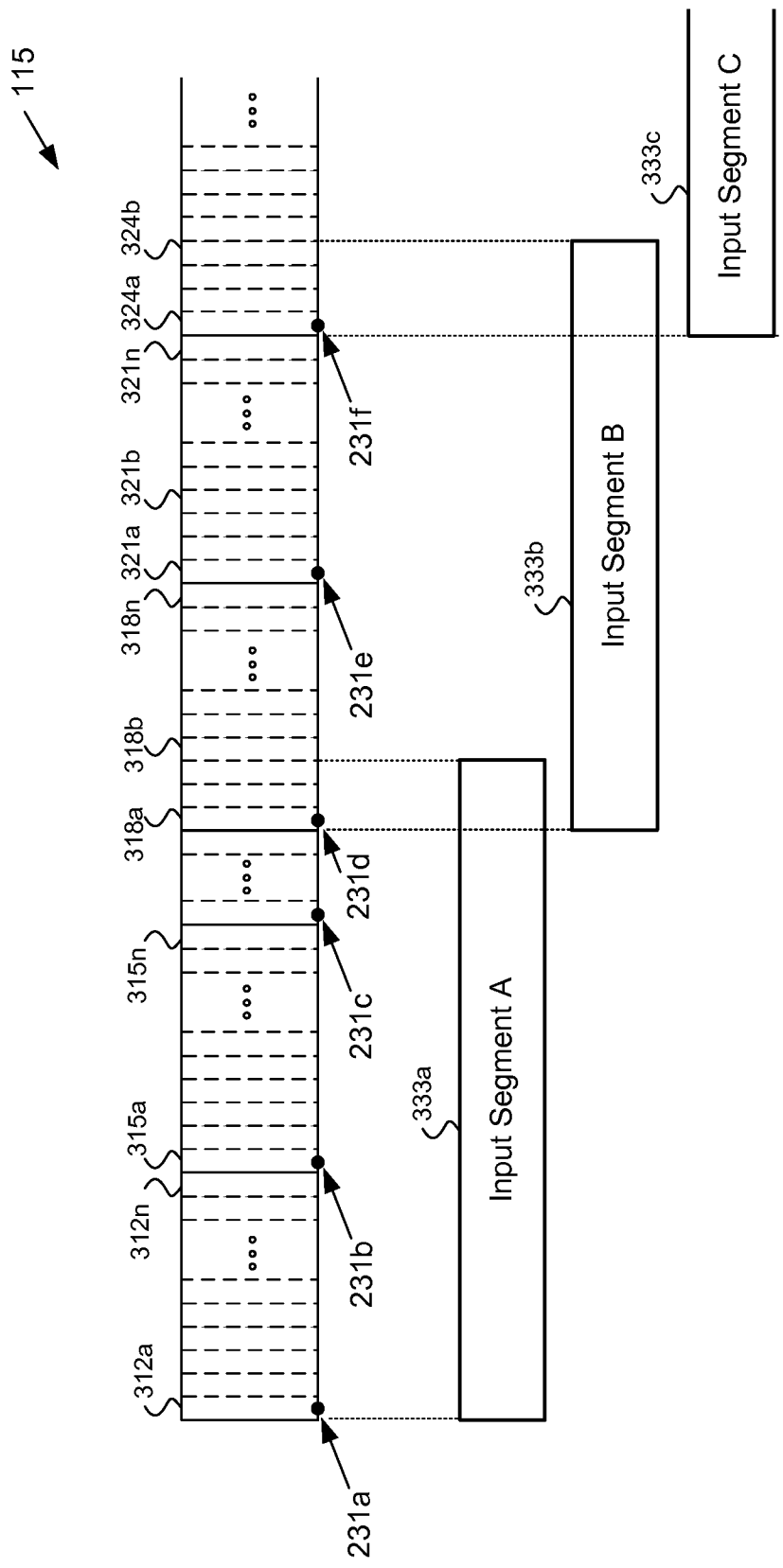
FIG. 3 is a diagram of an example of an input media file within the transcoding system of FIG. 1, in accordance with various embodiments.

Turning to FIG. 3, shown is a diagram of an example of an input media file 115 within the transcoding system of FIG. 1, in accordance with various embodiments. FIG. 3 depicts an input media file 115 expressed in terms of a sequence of pictures ordered according to presentation. The input media file 115 comprises a plurality of RAPs 231a-f. The input media file also comprises a first set of pictures 312a-n, a second set of pictures 315a-n, a third set of pictures 318a-n, a fourth set of pictures 321a-n, and/or any additional subsequent sets of pictures. In addition, FIG. 3 provides a non-limiting example of dividing the input media file 115 into a plurality of input segments 333a-c.

The transcode manager 123 (FIG. 1) may analyze the input media file 115 and determine a RAP list 231 (FIG. 2) for the input media file 115. Based on the location of the RAPs 231a-f, the transcode manager 123 may identify a starting point for each input segment. Each input segment 333a-c begins on a RAP 231a, 231d, 231f. For example, the first RAP 231a of the input media file 115 may indicate to the transcode manager 123 the generation of the starting point for the first input segment 333a.

The transcode manager 123 may be configured to generate each input segment 333a-c according to an optimal length. The length of an input segment 333a-c may be expressed in terms of a number of pictures, an amount of time, a number of bits, a number of RAPs encompassed by the input segment 333a-c, etc. Although each input segment 333a-c is not necessarily identically equal to other input segments 333a-c in terms of length, each input segment 333a-c may be approximately equal in length to other input segments 333a-c.

The transcode manager 123 divides the input media file 115 into input segments to effectuate parallel processing of the input media file 115. When input segments 333a-c are too long, the start-up costs to realize the benefits of parallel processing may be high. For example, if an input media file 115 is divided into four input segments 333c, where each segment is approximately a quarter in terms of length, then the benefits of parallel processing is not realized for the first quarter of the transcoding process.

When input segments are too short, the efficiency of a parallel transcoding system may be reduced due to overhead. The use of short segments may also increase the visibility or audibility of certain audio/visual artifacts/abnormalities in the output stream. For example, by separating an input media file 115 into short segments, and stitching the short transcoded segments together, the number of stitches increases and this may increase the occurrence of discontinuous values of some parameters in the transcoded output.

In various embodiments, the input segment length is approximately 10 seconds. According to this target length, the transcode manager 123 may find an end picture 318b, 324b for each input segment 333a-c. For example, the transcode manager 123 may identify the nearest RAP 231d, f that is 10 seconds beyond a respective starting picture 312a, 318a, 324a, for each input segment 333a-c. Based upon the nearest RAP 231d, f, the transcode manager 123 may add a predetermined length beyond the nearest RAP 231d, f in order to determine an ending picture for each input segment 333a-c. For example, the end picture of Input Segment A 333a may include a number of additional pictures 318a-b beyond the starting picture of Input Segment B 333b in order to provide an overlap for use in processing by a processor 156 (FIG. 1), as is described in further detail below.

In other embodiments, a transcoder device 134a-n (FIG. 1) is configured to indicate to the transcode manager 123 to stop feeding an input segment 333a-c when the transcoder device 134a-n has completed or is nearing completion of the transcoding process. Moreover, additional data beyond the ending picture that is fed to the transcoder device 134a-n may be dropped by the transcoder device 134a-n. To this end, the transcoder device 134a-n may determine the ending picture of an input segment 333a-c.

In the non-limiting example of FIG. 3, the transcode manager 123 identifies a starting picture 312a for the first input segment 333a. The transcode manager 123 identifies a subsequent RAP 231d that is approximately 10 seconds after the starting picture 312a in terms of presentation time. The transcode manager 123 and/or transcoder device 134a-n adds a predetermined length beyond the subsequent RAP 231d to identify the end picture 318b for the first input segment 333a. In this non-limiting example, the predetermined length is four pictures. Thus, the first input segment 333a encompasses a plurality of RAPs 231b, 231c in addition to the subsequent RAP 231d.

To identify the next input segment 333b, the transcode manager 123 sets the starting picture of the next input segment 333b as the last RAP 231d of the previous input segment 333a. This leads to an overlap between each input segment 333a-d. The overlap length is equal to the predetermined length. The predetermined length may be expressed in terms of a number of pictures, a time, a number of bits, etc.

By extending the end picture 318b, 324b to a predetermined length past a subsequent RAP 231d, f respectively, to create an overlap amount, a transcoder device 134a-n (FIG. 1) that transcodes an input segment 333a-d has additional information to adequately decode the last few pictures in an input segment 333a-c. For example, when decoding a target picture, multiple pictures that extend beyond the target picture in the bit stream may be needed. For example, with reference to the non-limiting example of FIG. 3, decoding a target picture 321n of input segment B 333b may require at least a portion of subsequent pictures 324a-b. By including these subsequent pictures 324a-c as part of input segment B 333b, it is ensured that the target picture 321n is adequately decoded.

In various embodiments, the transcode manager 123 may select a predetermined length based at least upon the processing functions to be performed by the transcoder devices 134a-n. For example, de-interlacing operations may require using a larger predetermined length than image enhancement operations.

Figure 4:
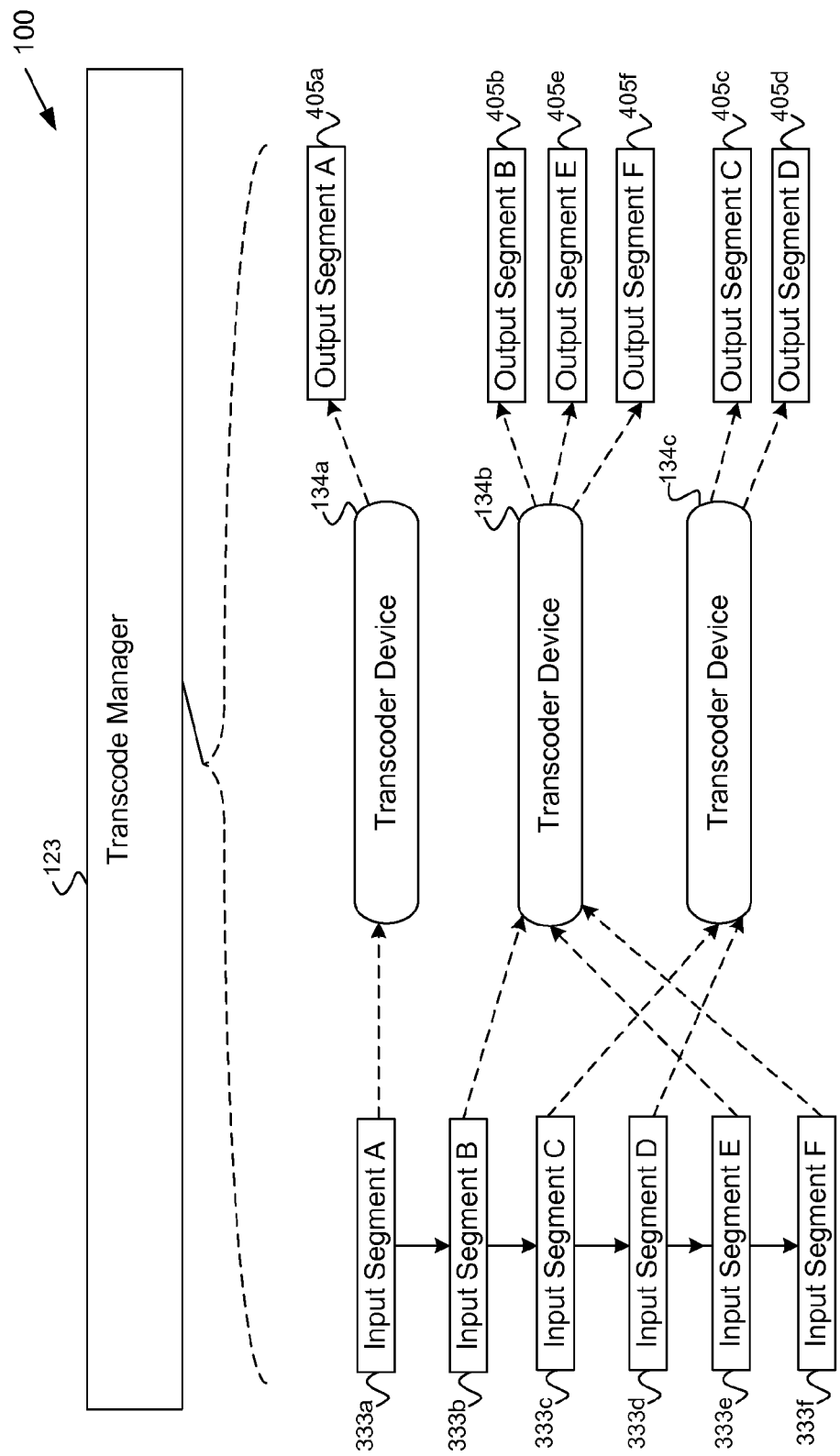
FIG. 4 is a diagram of an example of the operation of a transcode manager implemented within the transcoding system of FIG. 1, in accordance with various embodiments of the present disclosure.

Referring next to FIG. 4, shown is an example of the operation of a transcode manager 123 implemented within the transcoding system 100 of FIG. 1, in accordance with various embodiments of the present disclosure. FIG. 4 provides a non-limiting example of a transcode manager 123 that allocates a plurality of input segments 333a-f to various transcoder processes. These transcoder processes may operate concurrently for transcoding the input segments 333a-f in parallel. For example, the transcode manager 123 may allocate the input segments 333a-f to transcoder processes in three transcoder devices 134a-c. Each transcoder device 134a-c is configured to transcode received input segments 333a-f and generate corresponding output segments 405a-f.

The input segments 333a-f may be arranged in an order of presentation. That is to say, a user who plays back the media file observes the input segments 333a-f arranged in a chronologic sequence according to the presentation order. As the input segments 333a-f are transcoded in parallel by the transcoder devices 134a-c, an order of transcoding may occur such that the outputs of the transcoder devices 134a-c may need to be re-sequenced to maintain the original order of presentation. In this respect, the transcoding order may vary from the presentation order.

In the transcoding system 100 of FIG. 4, each transcoder device 134a-c may be characterized by varying transcoding speeds. For example, the first transcoder device 134a may be an inherently slower transcoder device than the second transcoder device 134b. In this case, a physical implementation of each transcoder device 134a-c may affect transcoding speeds and vary transcoding processing resources for each transcoder device 134a-c.

In addition, each input segment 333a-f may vary in terms of the number of pictures in each input segment or the complexity of the pictures in each input segment. For example, input segment A 333a may comprise a larger number of pictures than input segment C 333c. Thus, transcoding input segment A 333a may require substantially more time than transcoding input segment C 333c. For another example, input segment A 333a may comprise a series of pictures characterized by complex color patterns, motion, and/or movement. Input segment C 333c may comprise a series of monotone pictures with little to no motion or movement. Thus, transcoding input segment A 333a may require substantially more time than transcoding input segment C 333c.

When allocating input segments 333a-f to transcoder devices 134a-c, the transcode manager 123 may determine allocation by analyzing a workload queue of each transcoder device 134a-c. In various embodiments, each transcoder device 134a-c tracks the number of input segments 333a-f scheduled for transcoding. Each transcoder device 134a-c may maintain a counter to count the number of scheduled input segments 333a-f in a work queue. In another example, each transcoder device 134a-c provides an indication when it has completed transcoding each input segment. In other embodiments, each transcoder device 134a-c quantifies a progress status that correlates with the work load of the transcoding device 134a-c. For example, each transcoder device 134a-c may provide an estimated time of completion for the work scheduled in the work queue. The transcode manager 123 may track the work progress of each transcoder device 134a-c and allocate subsequent input segments 333a-f accordingly.

In the non-limiting example of FIG. 4, the transcode manager 123 sends input segment A 333a to the first transcoder device 134a, input segment B 333b to the second transcoder device 134b, and input segment C 333c to the third transcoder device 134c. At this point, each transcoder device 134a-c is presently transcoding a respective input segment 333a-c such that the work queue for each transcoder device 134a-c is populated. Moreover, each transcoder device 134a-c is transcoding the respective input segments 333a-c to generate corresponding output segments 405a-c, respectively.

The next sequential input segment, input segment D 333d, is to be allocated by the transcode manager 123. In various embodiments, the transcode manager 123 considers the transcoding progress of each transcoder device 134a-c. The transcode manager 123 may allocate input segment D 333d to the transcoder device 134a-c that could begin processing input segment D 333d at the earliest point in time. Assuming that the first transcoder device 134a and the second transcoder device 134b have later estimated times of completion than the third transcoder device 134c, the transcode manager 123 may allocate input segment D 333d to the third transcoder device 134c.

The transcode manager 123 may continue allocating input segments 333a-f based on the progress status of each transcoder device. Each transcoder device 134a generates corresponding output segments 405a-f. It may be the case that the output segments 405a-f are generated in an order that differs from the presentation order of the input segments 333a-f.

In various embodiments, the transcode manager 123 is configured to grant other transcoding systems 100 (FIG. 1) access to one or more transcoder devices 134a-c. For example, a first transcoding system 100 may share one or more transcoder devices 134a-c with another transcoding system 100. Each transcoding system 100 may be implemented as a portion of a respective STB or another computing device. In this respect, a network of STBs may be configured to share its transcoder devices 134a-c with other STBs. Alternatively, one STB may be configured to perform a plurality of transcode operations on a plurality of input files or streams concurrently. The transcode manager 123 may allow or deny access to transcoder devices 134a-c managed by the transcode manager 123. Similarly, a transcode manager 123 may request to use one or more transcoder devices 134a-c of another transcoding system 100. In this case, a set of transcoding systems 100 may be networked to facilitate resource sharing of respective transcoder devices 134a-c.

Figure 5:
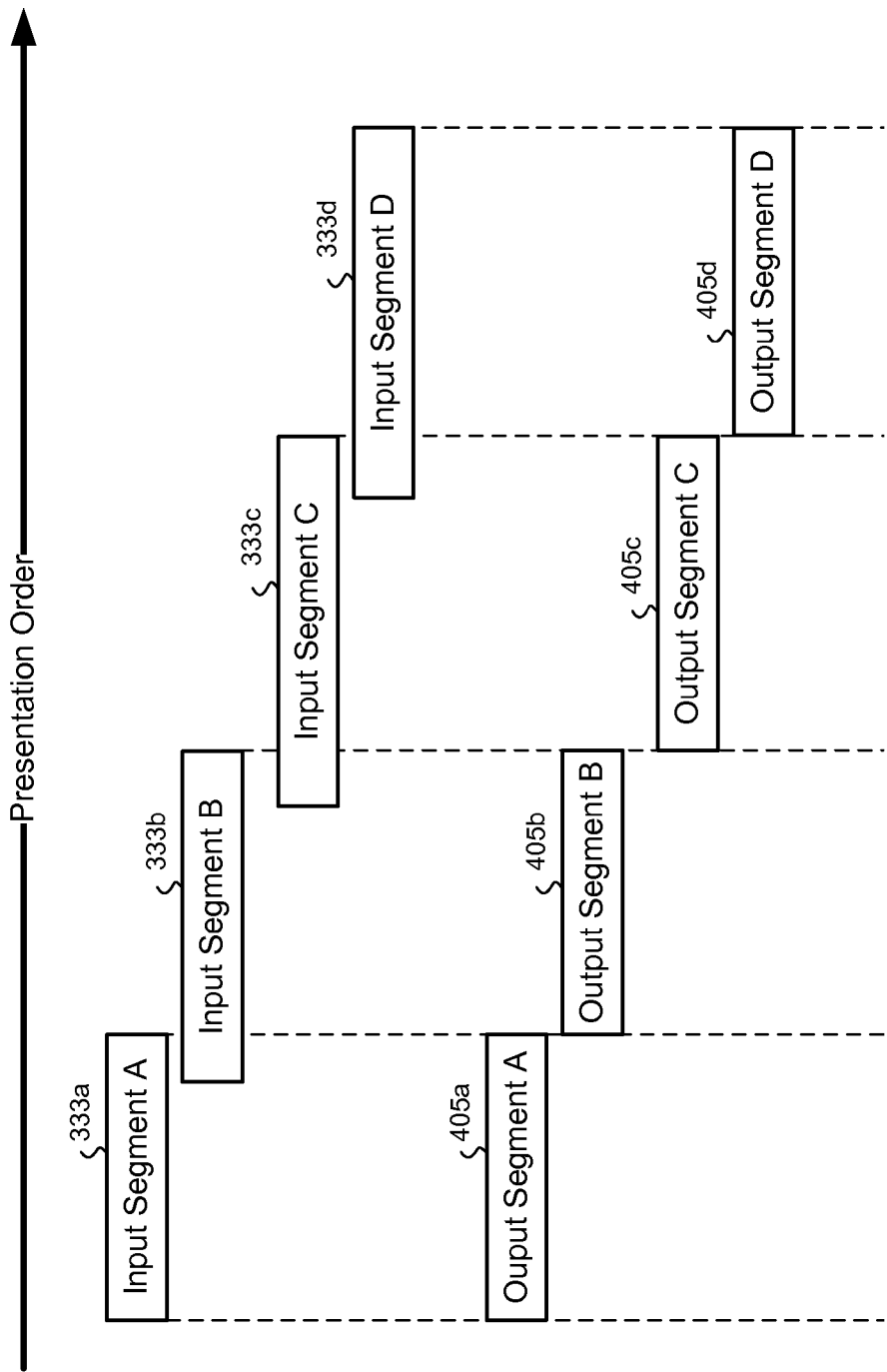
FIG. 5 is a diagram of an example of the operation of the transcoding system of FIG. 1, in accordance with various embodiments of the present disclosure.

Moving to FIG. 5, shown is a diagram of the operation of the transcoding system 100 of FIG. 1, in accordance with various embodiments of the present disclosure. FIG. 5 provides a non-limiting example of sequential input segments 333a-d and corresponding output segments 405a-d arranged in presentation order. In various embodiments, the output segments 405a-d are configured to form a series of contiguous output segments such that each output segment 405a-d does not overlap with an adjacent output segment 405a-d in the series of output segments.

Input segments 333a-d represent sequential, overlapping time ranges of an input media file 115 (FIG. 1). Thus, each input segment 333a-d may be characterized by a start time and a stop time in terms of presentation time. That is to say, each input segment 333a covers a time range or window of the media item expressed by the input media file 115. For example, assuming the media item is a movie, input segment A 333a covers 0 seconds to 10.5 seconds of the movie and input segment B covers 10.4 seconds to 20.2 seconds of the movie.

Each input segment 333a-d is sent to a respective transcoder device 134a-n (FIG. 1). A transcoder device 134a-n that receives an input segment 333a-d transcodes the received input segment 333a-d and generates a corresponding output segment 405a-d. Each output segment 405a-d is also characterized by a range of presentation time with a start time and a stop time. For example, following the example of the previous paragraph, output segment A 405a, which is a transcoded version of input segment A 333a, covers 0 seconds to 10.5 seconds of the transcoded movie. Output segment B 405b, which is a transcoded version of input segment B 333b, covers 10.5 seconds to 20.2 seconds of the transcoded movie.

As seen in the non-limiting example of FIG. 5, the output segments 405a-d of corresponding input segments 333a-d are sequential, contiguous, and non-overlapping. For example, the last picture of output segment A 405a immediately precedes the first picture of output segment B 405b. In this respect, the output segments 405a-d form a continuous series of segments that may be assembled to generate a transcoded output media file 121 (FIG. 1).

Each output segment 405a-d covers the same time range of the corresponding input segment 333a-d or covers a subset of the time range of the corresponding input segment 333a-d. For example, the time range for output segment A 405a is 0 seconds to 10.5 seconds, which is the same time range of input segment A 333a. However, the time range for output segment B 405b is 10.5 seconds to 20.2 seconds, which is a subset of the time range of input segment B 333b, which is 10.4 seconds to 20.2 seconds. Thus, the processor 156 (FIG. 1) of a transcoder device 134a-d receives a decoded input segment of a particular window of presentation time and generates a corresponding output segment that is associated with a subset of the window of presentation time of the input segment. This allows for the processor 156 to achieve the benefits of serial transcoding while actually implementing parallel transcoding.

For example, the processor 156 may perform a de-interlacing operation to generate an output segment associated with a particular window of presentation time. To generate the output segment, the input to the de-interlacing operation should be associated with an input window that is large enough to result in a sufficient de-interlacing operation to generate the output segment associated with the particular window of presentation time. In the non-limiting example of FIG. 5, output segment B 405b is associated with a window of 10.5 seconds to 20.2 seconds. The de-interlacing operation used to generate the output segment B 405 may need an input segment associated with a window that spans the range of at least 10.4 seconds to 20.2 seconds. Put another way, to de-interlace decoded pictures associated with the range of 10.5 seconds to 20.2 seconds, the de-interlacing operation may require utilizing decoded pictures that precede 10.5 seconds.

In various embodiments, the first input segment 333a of an input media file 115 covers the same time range as the corresponding output segment 405a. After the first output segment 405a, subsequent output segments are associated with respective time ranges that are subsets of corresponding input segment time ranges.

Figure 6:
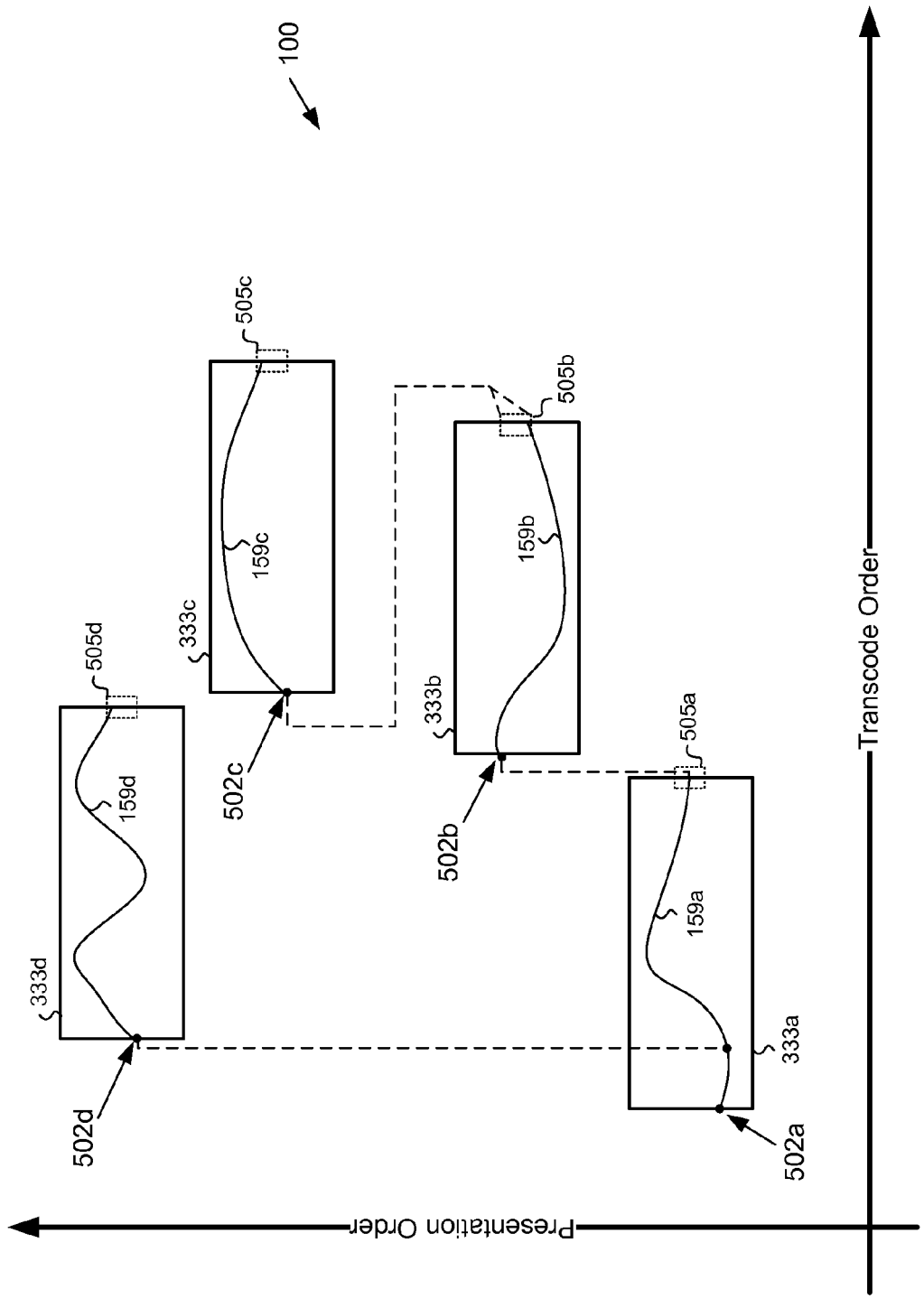
FIG. 6 is a diagram of an example of the operation of the transcoding system of FIG. 1, in accordance with various embodiments of the present disclosure.

Turning now to FIG. 6, shown is an example of the operation of the transcoding system 100 of FIG. 1, in accordance with various embodiments of the present disclosure. FIG. 6 provides a non-limiting example of transcoding four input segments 333a-d using parallel transcoder devices 134a-n (FIG. 1), where each input segment 333a-d is allocated by a transcode manager 123 (FIG. 1) to a respective transcoder device 134a-n.

Each input segment 333a-d is arranged along a y-axis in terms of presentation order. Input segment A 333a is first to be presented, input segment B 333b is immediately next, input segment C 333c immediately follows input segment B 333b, and input segment D 333d immediately follows input segment C 333c. The lower the input segment 333a-d is depicted along the y-axis, the earlier the input segment 333a-d is to be presented.

Each input segment 333a-d is also arranged along an x-axis in terms of transcode order. Input segments 333a-d that are closer to the left on the x-axis indicate that the input segment 333a-d is transcoded at an earlier point in time. Thus, input segment A 333a is the first input segment to be transcoded, followed by input segment D 333d, followed by input segment B 333b, followed by input segment C 333c. The staggered transcoding order may result from the parallel transcoder devices 134a-n processing input segments 333a-d at varying points in time. It may be inferred from the example of FIG. 6, that the transcoder device 134a-n that is designated to transcode input segment A 333a is not the same transcoder device 134a-n that is designated to transcode input segment D 333d. This inference is based on the fact that input segment A 333a and input segment D 333d have overlapping transcode times, and the assumption that a transcoder device 134a-n may process an input segment 333a-d one at a time. However, it may be inferred that the transcoder device 134a-n that is designated to transcode input segment A 333a could also be the same transcoder device 134a-n that is designated to transcode input segment B 333b or input segment C 333c. This is due to the fact that the transcode time of input segment A 333a neither overlaps with input segment B 333b nor input segment C 333c. However, a transcoder device 134a-n may be able to process more than one input segment 333a-d concurrently.

FIG. 6 also provides a non-limiting example of the dynamic adjustment of the QP 159a-d of each encoder 158 (FIG. 1) implemented in a corresponding transcoder device 134a-n. For example, the QP 159a associated with the encoding of input segment A 333a may be dynamically adjusted through the encoding process implemented by the transcoder device 134a-n responsible for transcoding input segment A 333a. To this end, the encoding of each input segment 333a-d comprises a corresponding QP 159a-d that may be adjusted through the course of encoding. When encoding a particular input segment 333a-d, the QP 159a-d may be initialized to an initial QP 502a-d. Additionally, the transcode manager 123 may direct each transcode process to process its respective QP 159a-d in such a way that it converges to a predetermined QP range 505a-d, as is discussed in further detail below.

In various embodiments, a transcode manager 123 is configured to manage the QP 159a-d for each transcoder process as the transcoder devices 134a-n process various series of input segments 333a-d. The encoder 158 of a transcoder device 134a-n may adjust the QP 159a-d as it performs the encoding process. Accordingly, each input segment 333a-d is associated with an initial QP 502a-d and a final QP, where the QP is used by each transcoder process to produce a corresponding output segment 405a-d. When the final QP of a particular input segment 333a-d significantly varies from the initial QP 502a-d of the next input segment 333a-d to be presented, a disjointed QP transition occurs. Disjointed QP transitions may lead to visual artifacts between the output segments 405a-d that correspond to transcoded input segments 333a-d. Thus, the transcode manager 123 may be configured to influence the QP 159a-d of each input segment 333a-d being encoded to generate a relatively continuous QP 159 across a series of sequential output segments 405a-d such that there is a relatively small difference in QP 159 from one output segment to the next In one embodiment among others, the transcode manager 123 obtains the final QP value of a completely encoded input segment 333a-d (e.g., newly generated output segment 405a-d) and uses this final QP value to set the initial QP 502a-d of the next input segment 333a-d to be presented. For example, the final QP of input segment A 333a may be used to initialize the initial QP 502 of input segment B 333b. In this case, the transcoder device 134a-n responsible for processing input segment A 333a communicates the final QP associated with input segment A 333a to the transcode manager 123. The transcode manager 123 may then control the transcoder device 134a-n that is responsible for processing input segment B 333b by setting the initial QP 502b.

However, it may be the case that an input segment 333b is being concurrently transcoded along with the next input segment 333c to be presented. For example, by the time input segment B 333b completes the transcoding process, input segment C 333c has already begun the transcoding process. To address this case, various embodiments relate to directing the QP 159b to converge within a predetermined QP range 505b. For example, as the transcode manager 123 monitors the encoding of input segment B 333b, the transcode manager 123 may set a predetermined QP range 505b to instruct or otherwise direct the QP 159b to converge within the predetermined QP range 505b. The transcode manager 123 may then initialize the QP 159c of input segment C 333c by setting the initial QP 502 of input segment C 333c based at least upon the predetermined QP range 505b of input segment B 333b. This may reduce the risk of a disjointed QP between output segment B 405b and output segment C 405c, thereby resulting in high visual quality of the resulting output file (stream).

In various embodiments, the predetermined QP range 505a-d may be determined dynamically during the encoding of each input segment 333a-d. For example, during the encoding process, the QP 159a-d of one or more output segments may be used to determine the predetermined QP range 505a-d for a particular output segment. In alternative embodiments, the predetermined QP range 505a-d may be fixed for all encoders. In this respect each encoder is committed to the same predetermined QP range 505a-d. In another alternative embodiment, the predetermined QP range 505a-d may be approximately equal for all encoders encoding output segments 405a-d, and the QP range 505a-d may vary over time.

It may also be the case that an input segment 333d associated with a later presentation time is encoded before an input segment 333b, c associated with an earlier presentation time. For example, input segment D 333d begins the encoding process before the encoding of input segments B and C 333b, c. Various embodiments of the present disclosure are directed to obtaining an instant QP 159a-d of an output segment 405a-d that is presently being encoded and using the instant QP 159a-d to initialize the initial QP 502a-d of another input segment 333a-d. For example, the transcode manager 123 may obtain an instant QP of input segment A 333a while input segment A is presently being encoded and use the instant QP as an initial QP 502d for input segment D 333d. Thus, the transcoding system 100 allows a transcode manager 123 to read QP 159a-d from transcoder devices 134a-d.

Figure 7:
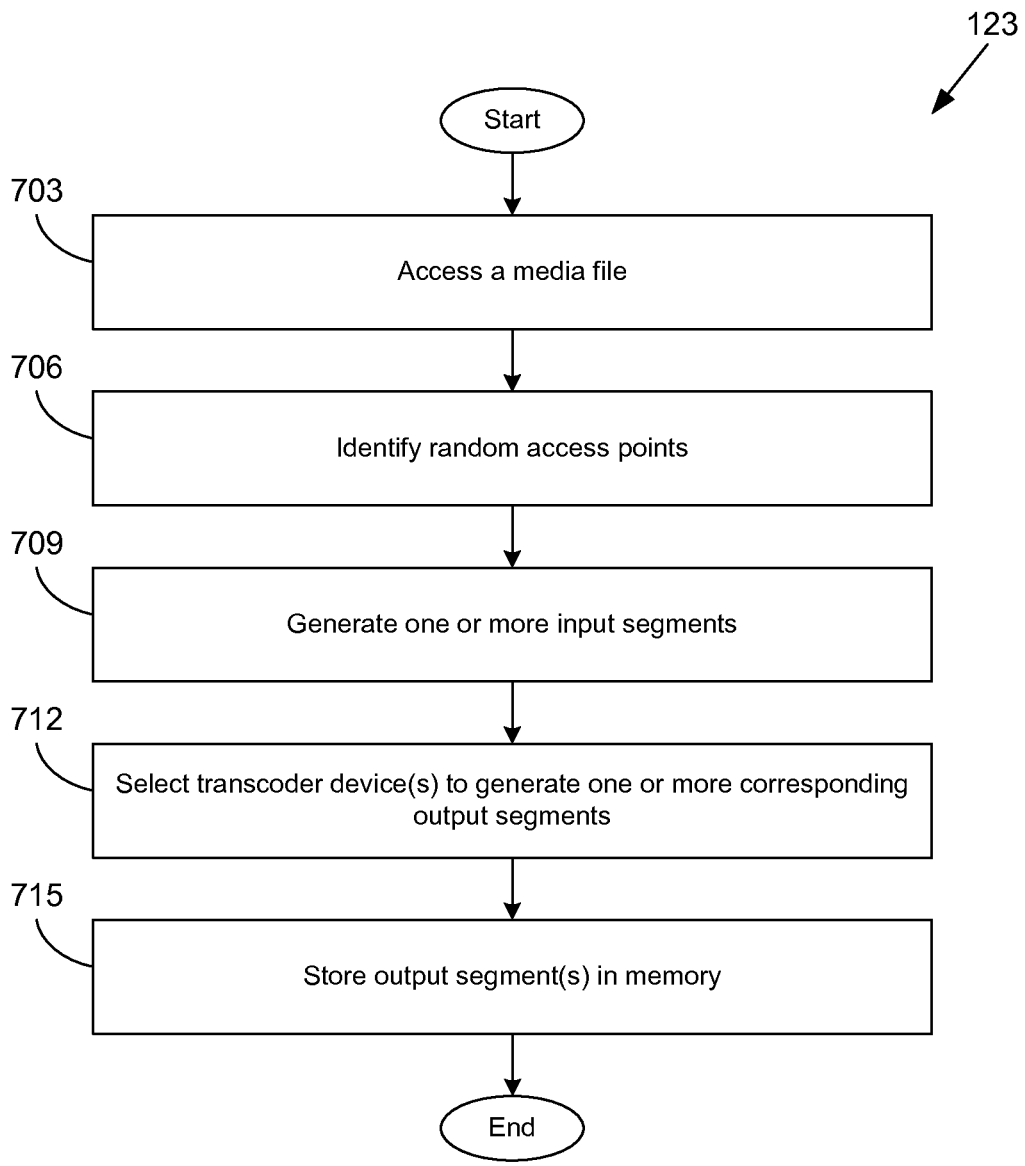
FIG. 7 is a flowchart illustrating examples of functionality implemented as portions of the transcode manager of FIG. 1, in accordance with various embodiments of the present disclosure.

Referring next to FIG. 7, shown is a flowchart illustrating examples of functionality implemented as portions of the transcode manager 123 of FIG. 1, in accordance with various embodiments of the present disclosure. It is understood that the flowchart of FIG. 7 provides merely an example of the many different types of functional arrangements that may be employed to implement the operation of the transcode manager 123 as described herein. As an alternative, the flowchart of FIG. 7 may be viewed as depicting an example of steps of a method implemented in the transcode manager 123 according to one or more embodiments.

To begin, at reference number 703, the transcode manager 123 accesses an input media file 115 (FIG. 1). The transcode manager 123 is configured to read the input media file from a source memory storage 112 (FIG. 1). The input media file 115 may be read as a bit stream that expresses a series of pictures. At reference number 706, the transcode manager 123 identifies random access points (RAPs) 231a-c (FIG. 2). RAPs may be identified based on a RAP list 231 (FIG. 2). The RAP list 231 may be part of the metadata associated with the input media file 115. The RAP list 231 may also be calculated by the transcode manager 123. In this case, the transcode manager 123 analyzes the input media file 115 and identifies the locations of RAPs.

At reference number 709, the transcode manager 123 generates one or more input segments 333a-c (FIG. 3). Input segments 333a-c are generated based at least upon the location of the RAPs 231a-f (FIG. 3). Each input segment 333a-c may comprise a starting point, and an ending point. The starting point for each input segment 333a-c may be a respective RAP 231a-f in the RAP list 231. Furthermore, each input segment 333a-c may encompass a number of RAPs 231a-f. In various embodiments, the endpoint is a predetermined number of pictures beyond the last RAP 231a-f of a particular input segment 333a-c. A following input segment 333a-c may have a starting point of the last RAP 231a-f of the previous input segment 333a-c. In this respect, the series of input segments 333a-c are sequential, continuous, and overlapping.

At reference number 712, the transcode manager 123 selects one or more transcoder devices 134a-n (FIG. 1) to generate corresponding output segments 405a-f (FIG. 4). Each transcoder device 134a-n is configured to receive an input segment 333a-f (FIG. 4), transcode the input segment 333*a-n*, and generate a corresponding output segment 405*a-f* (FIG. 4). In various embodiments, output segments 405*a-f* obtained from the output of the transcoder devices 134*a-f* may be sequenced according to presentation order. When sequenced, output segments 405*a-f* are non-overlapping and contiguous. The transcode manager 123 may sequence the output segments 405*a-f* using a mux 143 (FIG. 1) and/or buffer memory. At reference number 715, the transcode manager 123 stores the output segments 405*a-f* in memory. For example, the output segments 405*a-f* may be sequenced, stitched together and stored as an output media file 121 (FIG. 1) in a destination memory storage 118 (FIG. 1). Stitching may involve concatenating each output segment 405*a-f* in presentation order.

Figure 8:
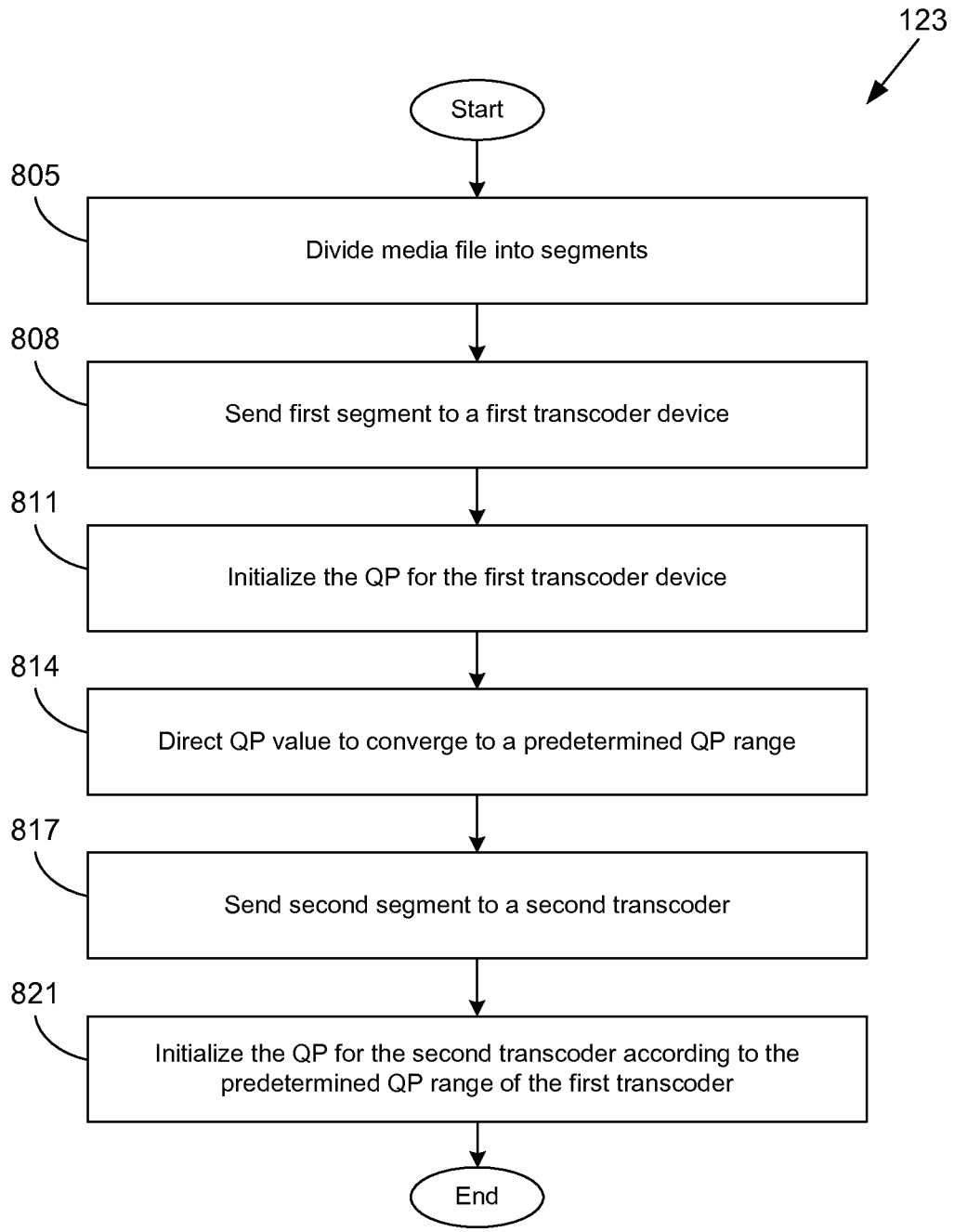
FIG. 8 is a flowchart illustrating examples of functionality implemented as portions of the transcode manager of FIG. 1, in accordance with various embodiments of the present disclosure.

Referring next to FIG. 8, shown is a flowchart illustrating examples of functionality implemented as portions of the transcode manager 123 of FIG. 1, in accordance with various embodiments of the present disclosure. It is understood that the flowchart of FIG. 8 provides merely an example of the many different types of functional arrangements that may be employed to implement the operation of the transcode manager 123 as described herein. As an alternative, the flowchart of FIG. 8 may be viewed as depicting an example of steps of a method implemented in the transcode manager 123 according to one or more embodiments.

To begin, at reference number 805, the transcode manager 123 divides an input media file 115 (FIG. 1) into input segments 333*a-c* (FIG. 3). Input segments 333*a-c* may be generated based at least upon the location of RAPs 231*a-f* (FIG. 3). Each input segment 333*a-c* may comprise a starting point, and an ending point. The starting point for each input segment 333*a-c* may be a respective RAP 231*a-f* in the RAP list 231. Furthermore, each input segment 333*a-c* may encompass a number of RAPs 231*a-f*. In various embodiments, the endpoint is a predetermined number of pictures beyond the last RAP 231*a-f* of a particular input segment 333*a-c*. A following input segment 333*a-c* may have a starting point of the last RAP 231*a-f* of the previous input segment 333*a-c*. In this respect, the series of input segments 333*a-c* are sequential, continuous, and overlapping.

In various embodiments, the transcode manager 123 is configured to provide an input segment as a stream comprising a starting picture to a transcoder device 134*a-n* (FIG. 1). In this respect, the transcode manager 123 may initially specify a nominal value as an ending picture in the input segment 333*a-c* or alternatively not specify an ending picture. In this non-limiting example, the transcode manager 123 may stop feeding the input segment stream upon receiving an instruction from the transcoder device 123 to stop feeding the input segment 333*a-c*.

At reference number 808, the transcode manager 123 sends a first input segment 333*a-c* to a first transcoder such as, for example, a transcoder device 134*a-n*. The first transcoder may be one among a plurality of transcoders configured to perform transcoder processes on the input media file 115 concurrently in parallel. In various embodiments, the transcode manager 123 determines to select the first transcoder based at least upon a transcoding progress of the present workload of each of the transcoders. At reference number 811, the transcode manager 123 initializes the QP 159 (FIG. 1) of the first transcoder. The transcode manager 123 may interface with a controller 149 (FIG. 1) of the transcoder to set the initial QP 502*a-d* (FIG. 6) of the encoder 158 (FIG. 1) of the transcoder. In various embodiments, the transcode manager 123 may set the initial QP 502*a-d* to a default value.

At reference number 814, the transcode manager 123 instructs or otherwise directs the QP 159 of the first transcoder to a predetermined QP range 505*a-d*. For example, the transcode manager 123 may use the controller 149 of the transcoder to set the predetermined QP range 505*a-d* of the encoder. By setting a predetermined QP range 505*a-d*, the encoder 158 that is encoding the first input segment 333*a-c* guides the QP 159 to converge to a final QP within the predetermined QP range 505*a-d*. The predetermined QP range 505*a-d* may be a fixed range that is global to all transcoding processes or it may be calculated dynamically by the transcode manager 123.

At reference number 817, the transcode manager 123 sends a second input segment to a second transcoder. The second input segment 333*a-c* may immediately follow the first input segment 333*a-c* in terms of presentation order. The transcode manager 123 may determine to select the second transcoder based at least upon a transcoding progress of or the instant workload of each of the transcoders.

At reference number 821, the transcode manager 123 initializes the QP 159 for the second transcoder according to the predetermined QP range 505*a-d* of the first transcoder. By directing the QP 159 associated with the first input segment 333*a-c* to converge to the predetermined QP range 505*a-d*, the transcode manager 123 may set an initial QP 502*a-d* for the second input segment 333*a-c* to match an expected ending QP 159 of the first input segment 333*a-c*. To this end, the transcode manager 123 is configured to reduce the likelihood of disjointed QPs 159 occurring at the seams of output segments 405*a-f* (FIG. 4).

The flowcharts of FIGS. 7 and 8 show the functionality and operation of an implementation of portions of the transcode manager 123 (FIG. 1). If embodied in software, each reference number, depicted as a block, may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the transcode manager 123 in a computer system or other system. The program instructions may be stored in a memory. The machine code may be converted from the source code, etc. If embodied in hardware, each block may represent a circuit or a number of interconnected circuits to implement the specified logical function(s).

Although the flowcharts of FIGS. 7 and 8 show a specific order of execution, it is understood that the order of execution may differ from that which is depicted. For example, the order of execution of two or more blocks may be scrambled relative to the order shown. Also, two or more blocks shown in succession in FIGS. 7 and 8 may be executed concurrently or with partial concurrence. Further, in some embodiments, one or more of the blocks shown in FIGS. 7 and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code, for example, code or instructions to execute portions of the transcode manager 123, can be embodied in any non-transitory computer-readable medium for use by or in connection with an instruction execution system such as, for example, transcode manager 123 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system, comprising:
a memory for storing a media file, the media file comprising a series of pictures;
a transcode manager configured to identify a set of random access points in the series of pictures, the transcode manager configured to divide the media file into input segments according to the set of random access points by designating a start picture and an end picture for each input segment, the transcode manager configured to, for each input segment:
designate a first random access point as the start picture;
identify a second random access point based at least in part on a target length from the start picture; and
select a picture a predetermined length after the second random access point as the end picture;
a plurality of transcoder devices configured to transcode the input segments in parallel to generate corresponding output segments, the transcode manager being further configured to allocate each input segment to a respective one of the plurality of transcoder devices; and
a memory for storing the output segments.

2. The system of claim 1, wherein the input segments comprise a first input segment and a second input segment, wherein the first input segment overlaps with the second input segment by the predetermined length.

3. The system of claim 1, wherein the output segments are configured to form a series of contiguous output segments such that each output segment does not overlap with an adjacent output segment in the series of output segments.

4. The system of claim 1, wherein each transcoding device comprises an encoder a pixel processor and a decoder, wherein the pixel processor is configured to perform at least one of a picture size adjustment, a format change, an interlacing operation, a de-interlacing operation, a noise reduction, a color space conversion, or an image enhancement.

5. The system of claim 1, wherein each transcoding device is configured to indicate a transcoding progress to the transcode manager.

6. The system of claim 1, wherein the transcode manager allocates one of the input segments to one of the plurality of transcoding devices based at least upon a transcoding progress of the one of the plurality of transcoding devices.

7. A method comprising:
accessing a media file, the media file comprising a bit stream expressing a series of pictures;
identifying a first random access point in the bit stream;
identifying a second random access point based at least in part on a target length from the first random access point in the bit stream;
generating an input segment of the bit stream, generating the input segment comprising designating the first random access point as a starting point of the input segment and selecting an end point of the input segment a predetermined length after the second random access point;
selecting one of a plurality of transcoder devices to transcode the input segment for generating a corresponding output segment, each transcoder device being configured to operate concurrently in parallel; and
storing the output segment in a memory.

8. The method of claim 7, wherein the input segment is a first input segment, wherein the method further comprises generating a second input segment of the bit stream, wherein a starting point of the second input segment is the second random access point.

9. The method of claim 7, wherein the input segment is a first input segment, wherein the method further comprises generating a second input segment of the bit stream, wherein the first input segment overlaps the second input segment.

10. The method of claim 7, wherein the one of the plurality of transcoder devices is a first transcoder device, wherein the input segment is a first input segment, wherein the output segment is a first output segment, wherein the method further comprises selecting a second transcoder device from the plurality of transcoder devices to transcode a second input segment for generating a corresponding second output segment.

11. The method of claim 10, wherein the first output segment does not overlap the second output segment.

12. A system, comprising:
a transcode manager configured to:
access a media file from a memory, the media file comprising a series of pictures;
identify a set of random access points in the series of pictures;
segment the media file according to the set of random access points by designating a start picture and an end picture for each input segment, the transcode manager configured to:
generate a first input segment by:
designating a first random access point as the start picture of the first input segment;
identifying a second random access point based at least in part on a target length from the start picture; and
selecting a picture a predetermined length after the second random access point as the end picture of the first input segment; and
generate a second input segment having the second random access point as the start picture of the second input segment, the first input segment overlapping the second input segment by the predetermined length;

initiate a first transcoding process to process the first input segment; and initiate a second transcoding process to process the second input segment, the first transcoding process and the second transcoding process being concurrently executed.

13. The system of claim 12, wherein the first transcoding process generates a first output segment based on the first input segment, wherein the second transcoding process generates a second output segment based on the second input segment.

14. The system of claim 12, wherein the first input segment and second input segment overlap in terms of presentation time.

15. The system of claim 1, wherein the target length is calculated using start-up costs and overhead of the transcoding process.

16. The system of claim 1, wherein the transcode manager is configured to identify the second random access point as the random access point, from among the set of random access points, that is nearest to a picture positioned the target length from the start picture.

17. The method of claim 7, wherein identifying the second random access point comprises identifying, from among the set of random access points, a random access point that is nearest to a picture positioned the target length from the start picture.

18. The system of claim 12, wherein the transcode manager is configured to identify the second random access point as the random access point, from among the set of random access points, that is nearest to a picture positioned the target length from the start picture.

19. The system of claim 1, wherein the target length from the start picture comprises at least one of:
a number of pictures from the start picture;
an amount of time from the start picture;
a number of bits from the start picture; or
a number of random access points from the start picture.

20. The method of claim 7, wherein the target length from the starting point comprises at least one of:
a number of pictures from the starting point;
an amount of time from the starting point;
a number of bits from the starting point; or
a number of random access points from the starting point.

21. The system of claim 12, wherein the target length from the start picture comprises at least one of:
a number of pictures from the start picture;
an amount of time from the start picture;
a number of bits from the start picture; or
a number of random access points from the start picture.

22. The system of claim 1, wherein the predetermined length after the second random access point comprises at least one of:
a number of pictures after the second random access point;
an amount of time after the second random access point;
a number of bits after the second random access point; or
a number of random access points after the second random access point.

23. The method of claim 7, wherein the predetermined length after the second random access point comprises at least one of:
a number of pictures after the second random access point;
an amount of time after the second random access point;
a number of bits after the second random access point; or
a number of random access points after the second random access point.

24. The system of claim 12, wherein the predetermined length after the second random access point comprises at least one of:
a number of pictures after the second random access point;
an amount of time after the second random access point;
a number of bits after the second random access point; or
a number of random access points after the second random access point.

* * * * *